Sept. 16, 1952          R. C. BEITZ          2,610,540
ELECTRICAL CONTROL MEANS FOR FILM DRIVING MECHANISMS
Filed Dec. 3, 1948
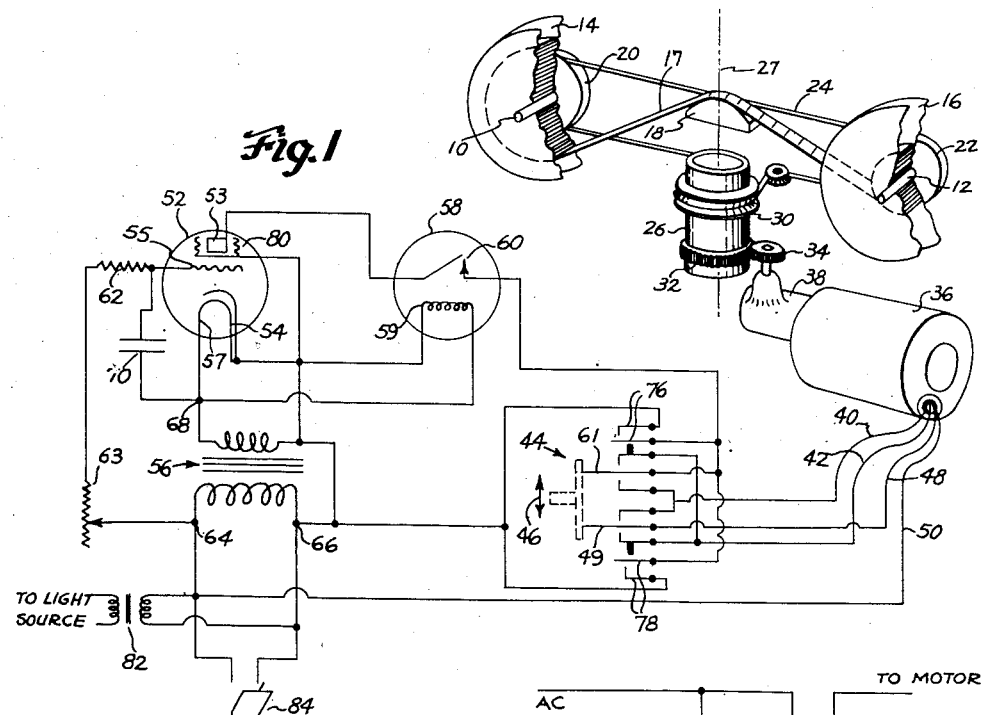
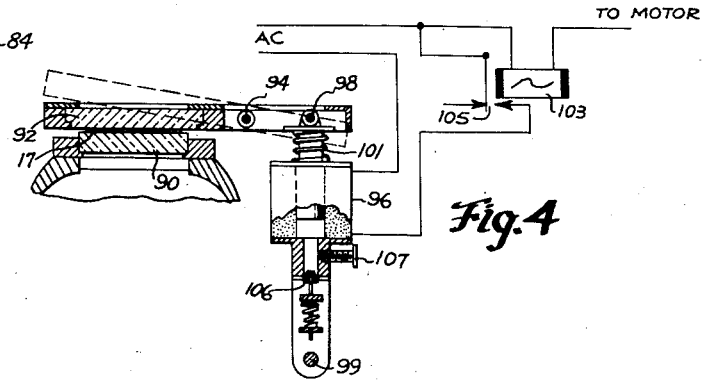
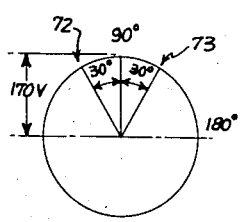
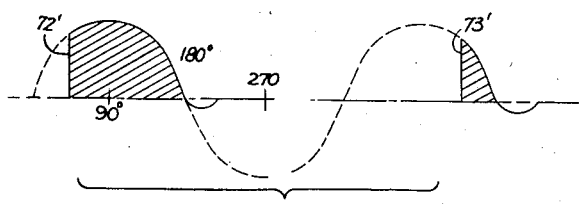
INVENTOR.
Richard C. Beitz
ATTORNEYS Patented Sept. 16, 1952

2,610,540

UNITED STATES PATENT OFFICE 2,610,540

ELECTRICAL CONTROL MEANS FOR FILM DRIVING MECHANISMS

Richard C. Beitz, Buffalo, N. Y., assignor to American Optical Company, Southbridge, Mass., a voluntary association of Massachusetts Application December 3, 1948, Serial No. 63,417

14 Claims. (Cl. 88—1)

This invention relates to winding and reeling mechanisms. More particularly it relates to efficient and inexpensive winding and reeling mechanisms for use in strip film projectors, readers and the like in which it is desirable to continuously transport either perforated or non-perforated strip film at a predetermined high speed across a projection aperture or film gate of the device in either direction for winding and rewinding purposes, or alternatively continuously transport the film across the gate or aperture at various selectable slow speeds in either direction for scanning purposes. The mechanism is also preferably of such high sensitivity and of such quick response that the film may be easily, rapidly and noiselessly moved by very small or larger increments in either direction for centering purposes relative to said projection aperture or film gate. Furthermore, the mechanism of the present invention is constructed and arranged in such a manner that it will cause the film to traverse the film gate or projection aperture at a more constant preselected low speed rate than has been possible heretofore with film of either type, notwithstanding the effective changing diameters of the film upon the film reels of the mechanism.

Many attempts have already been made to provide motor operated film winding or transporting mechanisms for continuously moving both perforated and non-perforated strip film, particularly of the photomicrographic type, across a projection aperture but because none of these motor operated mechanisms of earlier construction have proved entirely successful most microfilm readers and the like available to the public at the present time are equipped only with hand operated film moving mechanisms. One reason for this use of manually operated film drives is that a differential of between 10 to 1 or even 15 to 1 is desirable between the preferred high or winding speed and the average low or scanning speed for such a device. On the other hand, it might even be preferable to vary considerably the low or scanning speed, if such could be easily arranged. For example, the low speed might be increased somewhat for certain types of information or pictures being inspected or scanned, while other information might of necessity require a much lower than the average scanning speed. Also, different speeds of scanning of the material upon the strip film might be desired by different operators using the instrument. Furthermore, the magnification of the image upon the viewing screen of such a device is generally quite considerable (often as high as 10 to 1, or even as high as 40 to 1) with the result that the precision required for positioning or centering the images upon the screen and thus individual frames of the strip film properly longitudinally with respect to the projection aperture or film gate of the device places a severe requirement upon any motor operated film transporting mechanism which one might wish to use in such a film reader. Obviously, the greater the magnification of the instrument the more difficult it becomes to properly satisfy this requirement.

An additional condition which complicates the problem of providing a satisfactory power or motor operated drive mechanism for a film reader or projector of the type described is that as the film is unwound from one reel and wound upon the other, the diameters of the film upon the reels are continuously changing. Thus, it will be readily seen that in a reversible winding mechanism for a device of the type described, when most of the strip film is upon one of the reels, if one reel and then the other are rotated at the same speeds to pull the film across the film gate, the speed of the individual frames of the film crossing the film gate or projection aperture in one direction will be much greater than it will be in the opposite direction.

The present invention has overcome to a large extent the objections and difficulties mentioned above by providing for a projector or film reader, a transporting or winding mechanism for moving either perforated or non-perforated strip film across a film gate or the like which employs an electric motor and an electronics control system arranged to provide a predetermined high speed continuous drive in either direction and an extended range of continuous low speeds in either direction, and which low speeds are readily available to the operator at any time during use of the instrument. Also the driving and winding mechanism of the present invention is of such arrangement and construction and of such quick and sensitive character that positioning or centering of the individual frames may be easily accomplished with substantially no overrunning of the film at the film gate or projection aperture being experienced at low speeds, and even very little at high speeds. This is at least partly due to a counterelectromotive force set up in the motor and electronics system when power to the motor is terminated and this momentarily effects a braking action upon the film driving mechanism. Furthermore, the construction and arrangement of the mechanism of the present invention is such that a compensating effect is provided thereby in such a manner that it greatly minimized any differences which occur in the diameters of the film on the reels, with the effect that a more constant preselected speed is maintained by the film at the projection aperture at all selected low speeds. Additionally, the mechanism of the present invention is very silent in operation and noticeably free from moving parts and consequently free from wear and conditions requiring adjustments, replacements or maintenance.

Even though a thermionic tube is employed in the system of the present invention, the film winding mechanism can be operated immediately at its high speed for winding or rewinding purposes, and after a warming up period of only 15 seconds or so, the low speed control will become fully effective and thereafter remains available at all times while the projector is in use, both during extended periods of use at high speeds and while the film is allowed to remain stationary at a selected frame for a considerable period.

It is accordingly an object of the present invention to provide a quick acting and highly sensitive film winding or transporting mechanism which is constructed and arranged to move either perforated or non-perforated strip film continuously in either direction across an associated projection aperture or film gate at a predetermined high speed or continuously move it at any one of a variety of low speeds within a predetermined slower speed range; said lower speed range being adapted to allow the film to be moved across the projection aperture at a speed of approximately half said high speed or at any lower speed desired, even at such a low speed that movement of the image upon the viewing screen is almost imperceptible.

An additional object of the invention is to provide an electric motor drive and control system for a film winding or reeling mechanism of the character described which is of relatively inexpensive construction, composed of few component parts, noticeably free from moving elements requiring adjustments, maintenance or replacements, and which is very quiet at all speeds of operation thereof.

Other objects and advantages of this invention will become apparent from the detailed description which follows when taken in conjunction with the accompanying drawing in which:

Fig. 1 is partly a perspective and partly a schematic showing of a motor operated film winding or transporting mechanism and an electronics control system therefor;

Fig. 2 is a diagram showing preferred conditions of operations of the structure of Fig. 1;

Fig. 3 is a wave form during such operation; and

Fig. 4 is a modified form of film gate and associated structure which may be substituted for the curved film of the mechanism shown in Fig. 1.

Referring to the drawing in detail, it will be seen that Fig. 1 diagrammatically shows a pair of rotatable supporting spindles 10 and 12 upon which strip film supporting reels may be positioned in conventional fashion, such reels being indicated at 14 and 16 and the perforated or non-perforated strip film 17 carried thereby is arranged to extend over a curved film gate 18 having a projection aperture (not shown) therein so that light from a suitable light source may be projected downwardly through the film and the film gate for projection purposes. The spindles 10 and 12 are provided with quick acting one-way clutch mechanism (not shown) carried upon the associated driving pulleys 20 and 22 so that movement of a driving belt 24 actuated by a driving member 26 in one direction or the other will alternately rotate spindle 10 or 12 in a manner to pull the strip film 16 in one direction or the other across the film gate 18.

In Fig. 1, only a diagrammatic showing is presented but it should be appreciated that the spindles 10 and 12, the pulleys 20 and 22, the film gate and the auxiliary guide pulleys for the belt 24 may be carried upon a hollow supporting head arranged to rotate about a fixed hollow support surrounding the optical axis 27 of the device so that the light passing through the film and film gate may reach an objective within said fixed support for subsequent imaging upon a viewing screen or the like. The driving member 26 would be positioned about said fixed support and may be in the form of a cylindrical collar or ring carrying a grooved or pulley portion 30 for receiving a looped portion of the driving belt 24 and a ring gear 32 arranged to have meshing engagement with a drive pinion 34 of an electric motor 36. Such a construction allows all the images upon any film to be viewed in upright position upon the viewing screen. Obviously, in place of the gears 32 and 34, an endless belt and pulleys, or equivalent power transmitting means, could be employed if desired. The details of such a hollow rotatable head, fixed support, driving member and one-way clutch mechanisms for the spindles of a film winding mechanism are shown in copending application, Serial No. 660,231, filed April 6, 1946, and issued September 20, 1949, as Patent No. 2,482,666, and, accordingly, are not here described in greater detail.

At first glance, it might be thought that a reversible electric motor controlled by a conventional adjustable rheostat might be employed for moving the film across the film reader aperture in the manner stated above. However, such a motor and variable control have not been at all satisfactory since such will provide no more than a speed ratio in the neighborhood of 3 to 1 between high and low speed operating conditions. It has been found, on the other hand, that an electronic control circuit may be provided in conjunction with an electric motor of the proper construction to provide a much wider range of speeds, varying as much as 100 to 1 if such extremes are desirable.

The high speed electric motor 36 operates a reduction gearing 38 which in turn actuates the pinion 34. This motor is preferably of the universal (A. C.-D. C.) type and for smoothness of operation at very slow speeds the armature thereof may be skew wound. The armature of the motor 36 has its leads 40 and 42 connected in opposed relation to a control and reversing switch, generally indicated by numeral 44, so that when the manual control thereof is moved in opposite directions, as indicated by the double arrow 46, it may reverse the direction of the armature winding with respect to the field coil of the motor connected in series therewith. One lead 48 of the field coil is connected to a pole 49 of the switch and the other lead 50 is connected to a source of A. C. current supply.

When the switch 44 is moved to a first position in either direction during normal use of the projector or reader, the motor 36 will be connected in a low speed power circuit comprising a gas filled thermionic power transmitting tube 52 of conventional construction which allows current from the A. C. source to flow through the motor during each positive half cycle of the alternating current supply while an anode 53 of the tube is positive with reference to a cathode 54 and while the tube is not being controlled by a control grid 55 therein. An autotransformer 56 is provided for heating the filament 57 of this tube and in order that the tube will not attempt to conduct current before the cathode thereof is properly heated, a conventional thermal type time-delay relay 58 is provided, with the heating coil 59 thereof connected in parallel with the filament of the power tube 52 so that the bimetal snap switch 60 of the relay will not close and conduct current before the cathode is heated but will thereafter remain in a current conducting position all the time the filament of the power tube is energized. The switch 60 is located in series in said power circuit and between the anode 53 and another pole 61 of the control switch 44. Since the current for the motor 36 does not pass through the transformer 56 only a small filament heater type transformer is necessary.

The power transmitting tube 52 will normally transmit direct current during each half cycle the anode is positive with respect to the cathode and provided the grid 55 thereof is not negative with respect to the cathode. However, grid 55 is connected to a phase-shift circuit comprising a fixed resistor 62 in series with a variable resistor 63 which is in turn connected to an end terminal 64 of the transformer 56 and thus to one side of the A. C. power supply, which terminal is, during each positive half cycle, more positive than any other point on the transformer windings including an intermediate tap 66, and both points 64 and 66 are in turn positive with respect to the other end terminal 68 of the transformer. Capacitor 70 is connected between the grid 55 and point 68, and is part of the phase shift circuit. The winding between points 66 and 68 is so disposed that when point 64 is positive and 66 is negative, point 68 will be more negative than point 66 by a small percentage. The primary and secondary windings have an additive effect. Resistance 62 is connected closely adjacent the grid terminal of the tube so that no body capacity effect will be present when the operator adjusts resistor 63 during use of the projector.

In this manner, resistances 62 and 63 and capacitor 70, when of proper ratings, may be used to control the time or point during each positive half cycle when the grid 55 will become positive with respect to the cathode of the tube 52 and allow current to start flowing through the tube for operating motor 36. By adjusting resistor 63 in a manner to increase the resistance in the grid circuit the point at which tube 52 begins to conduct current may be delayed. If reference is made to Fig. 3, it will be seen that the alternating current wave form supplied by source is shown by dotted lines. If the tube 52 were not controlled by grid 55, it would conduct current during nearly the entire period of each positive half cycle while switch 44 is at its first position to either side of center, thereby providing a pulsating D. C. current to rotate the motor in the selected direction. However, by choosing proper sizes for the resistors 62, 63 and capacitor 70, adjustable resistor 63 may be arranged to control the point at which the grid bias will become sufficiently positive to allow the tube to start to conduct current. The earliest starting point is dependent upon the size of fixed resistor 62. By adjusting resistor 63 to place additional resistance in the grid circuit, the starting point may be retarded.

As shown by Fig. 2, the earliest starting point 72 is preferably disposed about 30° ahead of the 90° position during the positive half cycle and the latest starting point 73 preferably about 30° after the 90° position. Thus, for a conventional 120 volt A. C. current supply any starting point within this 60° range will have an appreciable initial voltage. The available average current during each positive half cycle when the earliest starting point 72 is being employed will be indicated by the shaded area in Fig. 3 to the right of starting line 72'. However, as stated above, by shifting resistor 63 to increase the resistance in the grid circuit the starting point may be retarded. In the preferred construction, this delayed starting point may be as much as 30° following the 170 maximum voltage value on the wave, and still have an appreciable initial voltage value as indicated by numeral 73'. The average amount of current available under such conditions during each positive half cycle for motor operation will be represented by the shaded area to the right of line 73'.

Resistor 62 may be so chosen that the highest low speed travel of the film will not be too high for practical purposes and the resistor 63 provides lesser speeds and determines the minimum amount of power which may be supplied to the motor. Proper size of resistor 63 insures that power cannot be supplied to the motor in such small quantities that it will be ineffectual for operating same but, on the other hand, of such quantities as to be injurious to the commutator of the motor. Using a motor which rotates at 9000 R. P. M. while driving the film at high speed, it has been found in actual practice that with the starting point at 72 a low motor speed of 4500 R. P. M. can be provided or when the starting point is shifted to 73 the speed can be retarded to as little as 40 R. P. M., which would be approximately one revolution a minute at the reel spindle.

The switch 44 is also provided with pairs of contacts 76 and 78 oppositely disposed and so arranged that if the switch is moved to a second position in either direction it will close either contact 76 or 78, as the case may be, and thus connect the anode of the tube 52 to the cathode thereof, thereby shorting-out or by-passing the tube. Since motor 36 is of a universal type, it will then operate at high speed, and in the direction desired, on the power derived directly by the full wave current of the alternating current supply. In order that tube 52 will not be injured or any injurious surge introduced into the A. C. supply circuit at such times, the tube is provided with a screened grid 80 thereof which is connected to the cathode and thereby subjected to the cathode potential. At 82 is shown a stepped-down transformer of conventional type for energizing the light source (not shown) of the projector. A main "on-off" switch is indicated at 84.

In Fig. 1 there is shown a curved film gate so disposed with reference to the film winding reels 14 and 16 that the film will be maintained at all times against the gate as it passes the projection aperture thereof, this condition maintaining the film at all times in proper focus whether standing still or being moved across the gate by the winding mechanism. Such a construction has the advantage that no complicated pressure plate mechanism is required and is particularly useful in readers or projectors adapted to project small size film, such as conventional 8 and 16 mm. strip film. It may be desirable, however, to transport film, particularly film of greater widths, across a flat projection aperture of a projector or reader, and with a pressure plate for maintaining the film in the focal plane of the objective.

In Fig. 4 stationary and movable transparent pressure plates are indicated at 90 and 92, respectively, with the plate 92 being arranged to pivot about a fixed axis 94. A solenoid for actuating plate 92 to open position is indicated at 96 and has one end thereof pivotally connected at 98 to a free arm portion of said gate and its opposite end pivotally connected to a fixed pin 99 or the like. A compression spring 101 is provided about the core of the solenoid to normally force the core outwardly and thereby maintain the plate or gate 92 in a closed position. However, when solenoid 96 is energized, it will draw the core inwardly and move plate 92 away from plate 90.

In order that such action may take place immediately before the film starts to move across the projection aperture, there may be provided a low resistance relay 103 connected directly in series with a lead to the motor 36 and this relay in turn arranged to close relay switch 105 so that solenoid 96 may be energized directly by the A. C. supply. The solenoid core may be arranged to have a close fitting "dash pot" action so that air within the solenoid may be expelled rapidly through an opening controlled by a one-way spring pressed valve 106. An adjustable bleed valve 107 may be arranged to allow the air to re-enter more slowly. In this way a slight delay in the closing of the gate 92 will occur after the current to the motor has been terminated. Instead of a low resistance relay 103 in series with a motor lead a relatively high resistance relay might be employed for controlling solenoid 96 in which case this relay would be connected across the armature leads or field coil leads of the motor.

From the foregoing, it will be seen that by using a series motor it may be operated on D. C. current at various slow speeds in either direction and may also be operated at high speed in either direction by A. C. current. Furthermore, when operating at slow speeds this motor will slow down and work harder in proportion to the increase in load, and since the load in a device of the character described is varied by the changing diameters of the film on the reels (which diameters on a conventional 100 foot reel of 16 mm. film will change from approximately 1⅜ inches to 3¼ inches), the film speed at the film gate will be rendered more nearly constant.

It is believed that a clear understanding of the invention will be had from the foregoing description. It should be noted, however, that while resistance and capacitance have been employed for effecting the desired phase-shift at the control grid 55, that impedance and capacitance could be, in a somewhat similar manner, employed as reactance means with equal advantage for controlling the phase-shift. While I have illustrated certain preferred modifications of the invention, it should be understood that my invention is not to be limited thereby but corresponds in scope to the appended claims.

Attention is called to applicant's copending application Serial Number 263,795, filed December 28, 1951, which is a division of this application.

I claim:

1. In a microfilm projector or the like, the combination of a film gate, a pair of film reel supporting spindles located in such a manner that a portion of strip film wound upon and extending between reels thereon will be disposed across said gate, power transmitting gearing operatively connected to said spindles so as to selectively actuate one or the other of said spindles when moved in opposite directions, a series type electric motor arranged to actuate said gearing and having its armature and field windings connected in series relation to each other, a supply circuit connecting a source of alternating current to said motor, a power transmitting thermionic tube connected in said supply circuit so that its anode current may energize said motor, a reversing switch in said supply circuit and connected to said armature and field windings so as to selectively reverse one winding of said motor with respect to the other winding when actuated while maintaining a series relation between said windings, and a phase-shifting circuit including resistance and reactance means arranged to be connected to said source of alternating current and to a control grid of said tube so as to control the phase relation between the grid and anode voltages thereof and thereby regulate the amount of anode current being supplied by said tube to said motor, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel.

2. In a microfilm projector or the like the combination of a film gate, a pair of film reel supporting spindles located in such a manner that a portion of strip film wound upon and extending between reels thereon will be disposed across said gate, power transmitting gearing operatively connected to said spindles so as to selectively actuate one or the other of said spindles when moved in opposite directions, a series type electric motor arranged to actuate said gearing and having its armature and field windings connected in series relation to each other, a supply circuit connecting a source of alternating current to said motor, a power transmitting thermionic tube connected in said supply circuit so that its anode current will energize said motor, a reversing switch in said supply circuit and connected to said armature and field windings so as to selectively reverse one winding of said motor with respect to the other winding when actuated while maintaining a series relation between said windings, and a phase-shifting circuit including a readily adjustable control member and electrical components for varying the preselected speed of said motor and arranged to be connected to said source and to a control grid of said tube so as to vary the phase relation between the grid and anode voltages thereof for regulating the amount of anode current being supplied to said motor, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel.

3. In a microfilm projector or the like the combination of a film gate, a pair of film reel supporting spindles located in such a manner that a portion of strip film wound upon and extending between reels thereon will be disposed across said gate, power transmitting gearing operatively connected to said spindles so as to selectively actuate one or the other of said spindles when moved in opposite directions, a series type electric motor arranged to actuate said gearing and having its armature and field windings connected in series relation to each other, a supply circuit connecting a source of alternating current to said motor, a power transmitting thermionic tube connected in said supply circuit so that its anode current will energize said motor, a reversing switch in said supply circuit and connected to said armature and field windings so as to selectively reverse one winding of said motor with respect to the other winding when actuated while maintaining a series relation between said windings, and a phase-shifting circuit including fixed and readily variable electrical components for varying the preselected speed of said motor and arranged to be connected to said source and to a control grid of said tube so as to vary the phase relation between the grid and anode voltages for regulating the amount of anode current being supplied to the motor, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel.

4. In a microfilm projector or the like, the combination of a film gate having curved film guiding portions, a pair of film reels supporting spindles located in such a manner that a portion of strip film wound upon and extending between reels thereon will be drawn into engagement with said curved guiding portions and constantly maintained while at rest and while in motion in a predetermined location relative the objective of said projector, a power transmitting gearing operatively connected to said spindles so as to selectively actuate one or the other of said spindles when moved in opposite directions, a series type electric motor arranged to actuate said gearing and having its armature and field windings connected in series relation to each other, a supply circuit connecting a source of alternating current to said motor, a power transmitting thermionic tube connected in said supply circuit so that its anode current will energize said motor, a reversing switch in said supply circuit and connected to said armature and field windings so as to selectively reverse one winding of said motor with respect to the other winding when actuated while maintaining a series relation between said windings, and a phase-shifting circuit including a readily adjustable control member and electrical components for varying the preselected speed of said motor and arranged to be connected to said source and to a control grid of said tube so as to vary the phase relation between the grid and anode of voltages thereof for regulating the amount of anode current being supplied to said motor, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel.

5. In a microfilm projector or the like the combination of a film gate comprising a stationary pressure plate and a movable pressure plate, a pair of film reel supporting spindles located in such a manner that a portion of strip film wound upon and extending between reels thereon will be disposed between said plates, power transmitting gearing operatively connected to said spindles so as to selectively actuate one or the other of said spindles when moved in opposed directions, a series type electric motor arranged to actuate said gearing and having its armature and field windings connected in series relation to each other, a supply circuit connecting a source of alternating current to said motor, a power transmitting thermionic tube connected in said supply circuit so that its anode current will energize said motor, a reversing switch in said supply circuit and connected to said armature and field windings so as to selectively reverse one winding of said motor with respect to the other winding when actuated while maintaining a series relation between said windings, a phase-shifting circuit including a readily adjustable control member and electrical components for varying the preselected speed of said motor and arranged to be connected to said source and to a grid of said tube so as to vary the phase relation between the grid and anode voltages for regulating the amount of anode current being supplied to said motor, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel, means for normally maintaining said movable pressure plate in closed position, and electrically responsive means connected to said movable pressure plate for maintaining it in spaced relation to said fixed plate at all times while said motor is moving film relative to said film gate.

6. In a microfilm projector or the like the combination of a film gate, a pair of film reel supporting spindles located in such a manner that a portion of strip film wound upon and extending between reels thereon will be disposed across said gate, power transmitting gearing operatively connected to said spindles so as to selectively actuate one or the other of said spindles when moved in opposite directions, a series type electric motor arranged to actuate said gearing and having armature and field windings, a supply circuit connecting a source of alternating current to said motor, a power transmitting thermionic tube connected in said supply circuit so that its anode current will energize said motor, a reversing switch in said supply circuit and arranged for selective movement to first positions in opposite directions for selectively connecting said armature and field windings in series relation to each other and for reversing one winding of said motor with respect to the other winding while maintaining a series relation between said windings, a phase-shifting circuit including resistance and reactance means arranged to be connected to said source of alternating current and to a control grid of said tube so as to control the phase relation between the grid and anode voltages and thereby regulate the amount of anode current being supplied by said tube to said motor for low speed operation thereof, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel, said switch being selectively movable to second positions in opposite directions for connecting the cathode of the tube to said anode while maintaining the selected series relation of said windings so that the supply of alternating current will by-pass said tube and energize said motor to effect a high speed operation of said motor in the direction selected.

7. In a microfilm projector or the like the combination of a film gate, a pair of film reel supporting spindles located in such a manner that a portion of strip film wound upon and extending between reels thereon will be disposed across said gate, power transmitting gearing operatively connected to said spindles so as to selectively actuate one or the other of said spindles when moved in opposite directions, a series type electric motor arranged to actuate said gearing and having armature and field windings, a supply circuit connecting a source of alternating current to said motor, a power transmitting thermionic tube connected in said supply circuit so that its anode current will energize said motor, a reversing switch in said supply circuit and arranged for selective movement to first positions in opposite directions for selectively connecting said armature and field windings in series relation to each other and for reversing one winding of said motor with respect to the other winding while maintaining a series relation between said windings, a phase-shifting circuit including a readily adjustable control member and electrical components arranged to be connected to said source of alternating current and to a control grid of said tube so as to vary the phase relation between the grid and anode voltages for regulating the amount of anode current being supplied by said tube to said motor for low speed operation thereof, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel, said switch being selectively movable to second positions in opposite directions for connecting the cathode of the tube to said anode while maintaining the selected series relation of said windings so that the supply of alternating current will by-pass said tube and energize said motor to effect a high speed operation of said motor in the direction selected.

8. In a microfilm projector or the like the combination of a film gate, a pair of film reel supporting spindles located in such a manner that a portion of strip film wound upon and extending between reels thereon will be disposed across said gate, power transmitting gearing operatively connected to said spindles so as to selectively actuate one or the other of said spindles when moved in opposite directions, a series type electric motor arranged to actuate said gearing and having armature and field windings, a supply circuit for connecting a source of alternating current to said motor, a power transmitting thermionic tube connected in said supply circuit so that its anode current will energize said motor, a reversing switch in said supply circuit and arranged for selective movement to first positions in opposite directions for selectively connecting said armature and field windings in series relation to each other and for reversing one winding of said motor with respect to the other winding while maintaining a series relation between said windings, a phase-shifting circuit including a readily adjustable control member and electrical components arranged to be connected to said source of alternating current and to a control grid of said tube so as to vary the phase relation between the grid and anode voltages for regulating the amount of anode current being supplied by said tube to said motor for low speed operation thereof, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel, said switch being selectively movable to second positions in opposite directions for connecting the cathode of the tube to said anode while maintaining the selected series relation of said windings so that the supply of alternating current will by-pass said tube and energize said motor to effect a high speed operation of said motor in the direction selected, and a second grid in said tube and connected to the cathode thereof so as to serve as protective biasing means for said tube when said switch is in either second position.

9. In a microfilm projector or the like the combination of a film gate having curved film guiding portions, a pair of film reel supporting spindles located in such a manner that a portion of strip film wound upon and extending between reels thereon will be constantly held in engagement with the said curved film guiding portions while at rest and while in motion, power transmitting gearing operatively connected to said spindles so as to selectively actuate one or the other of said spindles when moved in opposite directions, a series type electric motor arranged to actuate said gearing and having armature and field windings, a supply circuit for connecting a source of alternating current to said motor, a power transmitting thermionic tube connected in said supply circuit so that its anode current will energize said motor, a reversing switch in said supply circuit and arranged for selective movement to first positions in opposite directions for selectively connecting said armature and field windings in series relation to each other and for reversing one winding of said motor with respect to the other winding while maintaining a series relation between said windings, a phase-shifting circuit including a readily adjustable control member and electrical components arranged to be connected to said source of alternating current and to a control grid of said tube so as to vary the phase relation between the grid and anode voltages for regulating the amount of anode current being supplied by said tube to said motor for low speed operation thereof, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel, said switch being selectively movable to second positions in opposite directions for connecting the cathode of the tube to said anode while maintaining the selected series relation of said windings so that the supply of alternating current will by-pass said tube and energize said motor to effect a high speed operation of said motor in the direction selected.

10. In a microfilm projector or the like the combination of a film gate comprising a stationary pressure plate and a movable pressure plate, a pair of film reel supporting spindles located in such a manner that a portion of strip film wound upon and extending between reels on said spindles will be disposed between said plates, power transmitting gearing operatively connected to said spindles so as to selectively actuate one or the other of said spindles when moved in opposite directions, a series type electric motor arranged to actuate said gearing and having armature and field windings, a supply circuit for connecting a source of alternating current to said motor, a power transmitting thermionic tube connected in said supply circuit so that its anode current will energize said motor, a reversing switch in said supply circuit and arranged for selective movement to first positions in opposite directions for selectively connecting said armature and field windings in series relation to each other and for reversing one winding with respect to the other winding while maintaining a series relation between said windings, a phase-shifting circuit including a readily adjustable control member and electrical components arranged to be connected to said source of alternating current and to a control grid of said tube so as to vary the phase relation between the grid and anode voltages for regulating the amount of anode current being supplied by said tube to said motor for low speed operation thereof, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel, means for normally maintaining said movable pressure plate in closed position, and electrically responsive means connected to said movable pressure plate for maintaining it in spaced relation to said fixed plate at all times while said motor is moving film relative to said film gate, said switch being selectively movable to second positions in opposite directions for connecting the cathode of the tube to said anode while maintaining the selected series relation of said windings so that the supply of alternating current will by-pass said tube and energize said motor to effect a high speed operation of said motor in the direction selected.

11. In a microfilm projector or the like the combination of a film gate, a pair of film reel supporting spindles located in such a manner that a portion of strip film wound upon and extending between reels thereon will be disposed across said gate, power transmitting gearing operatively connected to one of said spindles so as to actuate same, a series type electric motor arranged to actuate said gearing and having armature and field windings, a supply circuit for connecting said motor to a source of alternating current, a power transmitting thermionic tube connected in said supply circuit so that its anode current will energize said motor, a switch in said supply circuit and arranged for movement from an inoperative position to a first operative position for completing said supply circuit through said tube and connecting said armature and field windings in series relation to each other, and a phase-shifting circuit including readily adjustable means and electrical components arranged to be connected to said source of alternating current and to a control grid of said tube so as to selectively control the phase relation between said grid and anode voltages for regulating the amount of anode current being supplied by the tube to said motor for low speed operation while the switch is in said first position, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the effective individual diameter of film wound upon either reel, said switch being movable from said first operative position to a second operative position for connecting the cathode of said tube to the anode while maintaining the series relation of said windings so that the supply of alternating current will by-pass said tube and energize said motor directly to effect a high speed operation of the motor.

12. In a microfilm projector or the like the combination of a film gate comprising a stationary pressure plate and a movable pressure plate, a pair of film reel supporting spindles located in such a manner that a portion of strip film wound upon and extending between reels thereon will be disposed across said gate, power transmitting gearing operatively connected to one of said spindles so as to actuate same, a series type electric motor arranged to actuate said gearing and having armature and field windings, a supply circuit for connecting said motor to a source of alternating current, a power transmitting thermionic tube connected in said supply circuit so that its anode current will energize said motor, a switch in said supply circuit and arranged for movement from an inoperative position to a first operative position for completing said supply circuit through said tube and connecting said armature and field windings in series relation to each other, a phase-shifting circuit including readily adjustable means and electrical components arranged to be connected to said source of alternating current to a control grid of said tube so as to selectively control the phase relation between said grid and anode voltages for regulating the amount of anode current being supplied by the tube to said motor for low speed operation while the switch is in said first position, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase shifting circuit regardless of the effective individual diameter of film wound upon either reel, means for normally urging said movable plate toward said stationary plate and closed position, and electrically responsive means connected to said movable plate for maintaining the movable plate in opened position while said motor is moving film relative to the film gate, said switch being movable from said first operative position to a second operative position for connecting the cathode of said tube to the anode while maintaining the series relation of said windings so that the supply of alternating current will by-pass said tube and energize said motor directly to effect a high speed operation of the motor.

13. In a microfilm projector or the like the combination of a film gate, a pair of film reel supporting spindles located in such a manner that a portion of strip film wound upon and extending between reels thereon will be disposed across said gate, power transmitting gearing operatively connected to one of said spindles so as to actuate same, a series type electric motor arranged to actuate said gearing and having armature and field windings, a supply circuit for connecting said motor to a source of alternating current, a power transmitting thermionic tube having an anode and a cathode connected to said supply circuit so that the anode current thereof may energize said motor, a transformer having a primary winding connected across said supply circuit and a secondary winding connected to said tube so as to heat said cathode, phase-shifting means connected to spaced points on said transformer windings and to a control grid of said tube so as to control the phase relation between the grid and anode voltages to thereby regulate the amount of anode current being supplied by said tube, and a control switch in said power supply circuit, said switch being arranged when moved to one predetermined operative position to close said supply circuit and connect said armature and field windings in series relation to each other for allowing said anode current to operate said motor at a predetermined low speed, and movable to another predetermined operative position for connecting the cathode of the tube to said anode to thereby by-pass said tube and allow the alternating current to energize said motor directly while maintaining said series relation for effecting high speed operation of said motor, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the effective individual diameter of film wound upon either reel.

14. In a microfilm projector or the like the combination of a film gate, a pair of film reel supporting spindles located in such a manner that a portion of strip film wound upon and extending between reels thereon will be disposed across said gate, power transmitting gearing operatively connected to said spindles so as to selectively actuate one or the other of said spindles when moved in opposite directions, a series type electric motor arranged to actuate said gearing and having armature and field windings, a supply circuit for connecting said motor to a source of alternating current, a power transmitting thermionic tube having an anode and a cathode connected to said supply circuit so that the anode current thereof may energize said motor, a transformer having a primary winding connected across said supply circuit and a secondary winding connected to said tube so as to heat said cathode, phase-shifting means having electrical components connected to spaced points on said transformer windings and to a control grid of said tube so as to control the phase relation between the grid and anode voltages thereof and regulate the amount of anode current being supplied by said tube to said motor for low operation thereof, and a switch in said supply circuit for controlling the supply of current to said motor, said switch being selectively movable to predetermined operative positions in different directions for connecting said armature and field windings in series relation to each other and for reversing said armature winding with respect to said field winding while maintaining a series relation therebetween, for effecting a predetermined low speed operation of the motor in one direction or the other, the speed of rotation of said motor and said power transmitting gearing, and accordingly, the speed of the spindle being actuated thereby, being materially influenced by the load placed upon the series motor and substantially independently of the relative diameters of the film wound upon said reels, and thereby providing a nearly constant speed of travel of said film at said film gate as established by the phase-shifting circuit regardless of the direction of travel of said film or the effective individual diameter of film wound upon either reel, said switch being selectively movable to other predetermined positions in different directions for connecting the cathode of said tube to the anode thereof while maintaining said series relation and thereby supply alternating current to said motor for effecting a high speed of operation thereof in one direction or the other.

RICHARD C. BEITZ.

REFERENCES CITED

The following references are of record in the file of this patent:

UNITED STATES PATENTS

| Number | Name | Date |
|---|---|---|
| 1,227,815 | Meyer | May 29, 1917 |
| 1,815,486 | Serrurier | July 21, 1931 |
| 2,099,682 | Draeger | Nov. 23, 1937 |
| 2,139,295 | Woodling | Dec. 6, 1938 |
| 2,264,333 | Satterlee | Dec. 2, 1941 |
| 2,412,551 | Pratt et al. | Dec. 10, 1946 |
| 2,413,070 | Reeves | Dec. 24, 1946 |
| 2,487,476 | Pratt et al. | Nov. 8, 1949 |